United States Patent
Odagiri et al.

(10) Patent No.: US 12,098,989 B2
(45) Date of Patent: Sep. 24, 2024

(54) VISCOELASTICITY MEASUREMENT METHOD AND VISCOELASTICITY MEASUREMENT DEVICE

(71) Applicant: A&D COMPANY, LIMITED, Tokyo (JP)

(72) Inventors: Tsutomu Odagiri, Saitama (JP); Taku Nakamoto, Saitama (JP); Shinsuke Miura, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 274 days.

(21) Appl. No.: 17/779,988

(22) PCT Filed: Dec. 26, 2019

(86) PCT No.: PCT/JP2019/051162
§ 371 (c)(1),
(2) Date: May 25, 2022

(87) PCT Pub. No.: WO2021/130970
PCT Pub. Date: Jul. 1, 2021

(65) Prior Publication Data
US 2022/0412861 A1    Dec. 29, 2022

(51) Int. Cl.
*G01N 11/16* (2006.01)
(52) U.S. Cl.
CPC .................................. *G01N 11/16* (2013.01)
(58) Field of Classification Search
CPC .. G01N 11/16; G01N 2009/006; G01N 9/002; G01N 11/162
USPC ....... 702/22, 23, 33, 41, 127, 189; 73/54.01, 73/54.24–54.27, 54.41
See application file for complete search history.

(56) References Cited

U.S. PATENT DOCUMENTS

| | | | |
|---|---|---|---|
| 5,895,842 | A | 4/1999 | Henderson |
| 2002/0007665 | A1 | 1/2002 | Miura |
| 2010/0005865 | A1 | 1/2010 | Miura |
| 2017/0030870 | A1 | 2/2017 | Dual et al. |

FOREIGN PATENT DOCUMENTS

| | | |
|---|---|---|
| JP | 11-173967 A | 7/1999 |
| WO | 2014049698 A1 | 4/2014 |

OTHER PUBLICATIONS

International Search Report and Written Opinion issued in the corresponding Application No. PCT/JP2019/051162 issued on Mar. 17, 2020.

*Primary Examiner* — Robert R Raevis
(74) *Attorney, Agent, or Firm* — Studebaker & Brackett PC

(57) ABSTRACT

Provided is a viscoelasticity measuring method and a viscoelasticity measuring device which reduce the number of measurement points and simplify a device design. In order to achieve the object described above, in a viscoelasticity measuring method, a vibrator is immersed in a measurement liquid, a drive signal for driving the vibrator at a resonance frequency ($f_{00}$) of the vibrator in the air is output, vibration of the vibrator is detected by a detection sensor, and a signal phase delay ($\Delta$) of a sensor output signal of the detection sensor with respect to the drive signal is measured.

14 Claims, 8 Drawing Sheets

VISCOELASTICITY MEASUREMENT METHOD AND VISCOELASTICITY MEASUREMENT DEVICE

TECHNICAL FIELD

The present invention relates to a method for measuring a viscoelasticity of a measurement liquid by using a mechanical vibrator, and a device for the method.

BACKGROUND ART

As a device that measures properties of a liquid, there is a device that analyzes an influence of a liquid on vibration characteristics of a mechanical vibrator (hereinafter, simply referred to as a vibrator) by vibrating the vibrator in the liquid. A tuning fork vibration viscometer vibrates two vibrators in opposite phases in a measurement liquid, and measures a viscosity by converting a current value at which the amplitudes of the vibrators become constant. A rotational vibration viscometer resonates one vibrator in a rotation direction in a measurement liquid, and measures a viscosity by converting a driving force (torque) with which the amplitude of the vibrator becomes constant.

Here, Patent Literature 1 discloses a tuning fork vibration viscometer capable of measuring a viscosity of a measurement liquid by changing an amplitude (shear rate) of vibrators, however, Patent Literature 1 does not arrive at a measurement of a viscoelasticity of a measurement liquid.

On the other hand, Patent Literatures 2 and 3 disclose rotational vibration viscometers capable of obtaining a viscoelasticity of a liquid. In Patent Literature 2, in a measurement liquid, a vibrator is controlled and vibrated by a PLL circuit with a constant driving force, a frequency $f_{90}$ and an amplitude $x_{90}$ of the vibrator when a phase angle is 90° are measured, a real part of a complex impedance of the liquid is obtained from a measurement value of $x_{90}$, and an imaginary part of the same impedance is obtained from a measurement value of $f_{90}$. In Patent Literature 3, a vibrator is controlled and vibrated at special phase angles of 45°, 90°, and 135° in a measurement liquid by a PLL circuit with a constant driving force, respective frequencies $f_{90}$, $f_{45}$, and $f_{135}$ are measured, a real part of an impedance of the liquid is obtained from the measurement values of $f_{45}$ and $f_{135}$, and an imaginary part of the same impedance is obtained from the measurement value of $f_{90}$. After the real part and the imaginary part of the complex impedance of the measurement liquid are obtained, by using these, a viscoelastic phase angle $\delta$ and an absolute value $\eta_{ab}$ of a complex viscosity can be obtained.

CITATION LIST

Patent Literatures

[Patent Literature 1] International Publication No. 2014-049698
[Patent Literature 2] Japanese Patent No. 3348162
[Patent Literature 3] Japanese Patent No. 4555368

DISCLOSURE OF INVENTION

Technical Problems

According to Patent Literatures 2 and 3, a viscoelasticity of a measurement liquid can be measured by using a mechanical vibrator. However, these have a problem in which, for obtaining a viscoelasticity, the number of measurement points is large according to the plurality of frequencies, and a problem in which a PLL circuit needs to be controlled through the liquid, and therefore, a precise and expensive circuit is necessary for obtaining measurement accuracy.

The present invention was made based on the problems in conventional technologies, and an object thereof is to provide a viscoelasticity measuring method and a viscoelasticity measuring device which reduce the number of measurement points and simplify a device design.

Problems to be Solved by the Invention

In order to solve the problems described above, in a viscoelasticity measuring method according to an aspect of the present invention, a vibrator is immersed in a measurement liquid, a drive signal for driving the vibrator at a resonance frequency ($f_{00}$) of the vibrator in the air is output, vibration of the vibrator is detected by a detection sensor, and a signal phase delay ($\Delta$) of a sensor output signal of the detection sensor with respect to the drive signal is measured.

In order to solve the problems described above, in a viscoelasticity measuring method according to another aspect of the present invention, a vibrator is immersed in a measurement liquid, a drive signal for driving the vibrator at a resonance angular frequency ($\omega_{00}$) of the vibrator in the air is output, vibration of the vibrator is detected by a detection sensor, an amplitude ($x_{00}$) of the vibrator is measured, a signal phase delay ($\Delta$) of a sensor output signal of the detection sensor with respect to the drive signal is measured, an absolute value ($\eta_{ab}$) of a complex viscosity of the measurement liquid is calculated from the amplitude ($x_{00}$), the resonance angular frequency ($\omega_{00}$), and a density ($\rho$) of the measurement liquid based on a numerical expression (1):

$$x_{00} = \frac{F}{\omega_{00}\sqrt{\omega_{00}\rho\eta_{ab}}} \qquad \text{[Numerical Expression 1]}$$

and a viscoelastic phase angle ($\delta$) of the measurement liquid is calculated from the signal phase delay ($\Delta$).

In order to solve the problems described above, a viscoelasticity measuring method according to still another aspect of the present invention, includes a step of outputting a drive signal for driving, in a measurement liquid, a vibrator at a resonance frequency ($f_{00}$) of the vibrator in the air, a step of detecting vibration of the vibrator as a sensor output signal from a detection sensor, a step of generating a complex baseband signal having an in-phase component I in phase with the drive signal and a quadrature component Q orthogonal to the drive signal by quadrature detection of the sensor output signal, a step of calculating a signal phase delay ($\Delta$) of the sensor output signal with respect to the drive signal from the complex baseband signal values (I, Q) based on a numerical expression (2):

$$\Delta = \tan^{-1}\frac{Q}{I} \qquad \text{[Numerical Expression 2]}$$

and a step of calculating a viscoelastic phase angle ($\delta$) of the measurement liquid from the signal phase delay ($\Delta$).

In the aspect described above, it is also preferable that the viscoelasticity measuring method further includes a step of calculating an absolute value ($\eta_{ab}$) of the complex viscosity of the measurement liquid from the complex baseband signal values (I, Q), an angular frequency ($\omega_{00}$) of the resonance frequency ($f_{00}$), a driving force (F) for the vibrator, and a density ($\rho$) of the measurement liquid.

In the aspect described above, it is also preferable that, in the step of calculating the viscoelastic phase angle ($\delta$), the viscoelastic phase angle ($\delta$) is calculated from a relational expression of, (i) when the detection sensor is a displacement sensor or an accelerometer, a numerical expression (3):

$$\Delta = \frac{\pi}{4} + \frac{\delta}{2} \qquad \text{[Numerical Expression 3]}$$

(ii) when the detection sensor is a speed sensor, a numerical expression (4):

$$\Delta = -\frac{\pi}{4} + \frac{\delta}{2} \qquad \text{[Numerical Expression 4]}$$

In the aspect described above, it is also preferable that, in the step of calculating an absolute value ($\eta_{ab}$) of a complex viscosity of the measurement liquid described in claim 4, an absolute value ($\eta_{ab}$) of the complex viscosity is calculated from a relational expression of, (i) when the detection sensor is a displacement sensor, a numerical expression (5):

$$\sqrt{I^2 + Q^2} = \frac{F}{2\omega_{00}\sqrt{\omega_{00}\rho\eta_{ab}}} \qquad \text{[Numerical Expression 5]}$$

(ii) when the detection sensor is a speed sensor, a numerical expression (6):

$$\sqrt{I^2 + Q^2} = \frac{F}{2\sqrt{\omega_{00}\rho\eta_{ab}}} \qquad \text{[Numerical Expression 6]}$$

(iii) when the detection sensor is an accelerometer, a numerical expression (7):

$$\sqrt{I^2 + Q^2} = \frac{\omega_{00}F}{2\sqrt{\omega_{00}\rho\eta_{ab}}} \qquad \text{[Numerical Expression 7]}$$

In the aspect described above, it is also preferable that the viscoelasticity measuring method further includes a step of calculating a complex viscosity coefficient ($\eta^*$) and a complex rigidity modulus ($G^*$) of the measurement liquid from the viscoelastic phase angle ($\delta$) and the absolute value ($\eta_{ab}$) of the complex viscosity.

In order to solve the problems described above, a viscoelasticity measuring device according to an aspect of the present invention includes a vibrator, a driving unit configured to vibrate the vibrator, a detection sensor configured to detect vibration of the vibrator, an amplitude measuring unit configured to measure, in a measurement liquid, an amplitude ($x_{00}$) at a resonance frequency ($f_{00}$) of the vibrator in the air, a phase difference measuring unit configured to measure a phase difference between a drive signal for the driving unit and a sensor output signal from the detection sensor as a signal phase delay ($\Delta$), and an arithmetic processing unit configured to calculate an absolute value ($\eta_{ab}$) of a complex viscosity of the measurement liquid from the amplitude ($x_{00}$), and calculate a viscoelastic phase angle ($\delta$) of the measurement liquid from the signal phase delay ($\Delta$).

In order to solve the problems described above, a viscoelasticity measuring device according to another aspect of the present invention includes a vibrator, a driving unit configured to vibrate the vibrator, a detection sensor configured to detect vibration of the vibrator, a quadrature detection unit configured to output a drive signal to the driving unit, receive a sensor output signal from the detection sensor, and perform quadrature detection of the sensor output signal to generate a complex baseband signal having an in-phase component I in phase with the drive signal and a quadrature component Q orthogonal to the drive signal, and an arithmetic processing unit configured to calculate a signal phase delay ($\Delta$) of the sensor output signal with respect to the drive signal from the complex baseband signal values (I, Q), and calculate a viscoelastic phase angle ($\delta$) of the measurement liquid from the signal phase delay ($\Delta$).

In the aspect described above, it is also preferable that the arithmetic processing unit calculates an absolute value ($\eta_{ab}$) of a complex viscosity of the measurement liquid from the complex baseband signal values (I, Q), an angular frequency ($\omega_{00}$) of the resonance frequency ($f_{00}$), a driving force (F) for the vibrator, and a density ($\rho$) of the measurement liquid.

In the aspect described above, it is also preferable that the arithmetic processing unit calculates a complex viscosity coefficient ($\eta^*$) and a complex rigidity modulus ($G^*$) of the measurement liquid from the viscoelastic phase angle ($\delta$) and the absolute value ($\eta_{ab}$) of the complex viscosity.

Effect of the Invention

According to the viscoelasticity measuring method and device of the present invention, the number of measurement points for a viscoelasticity measurement becomes small, and the device design becomes simple.

EMBODIMENTS FOR IMPLEMENTING INVENTION

Figure 1:
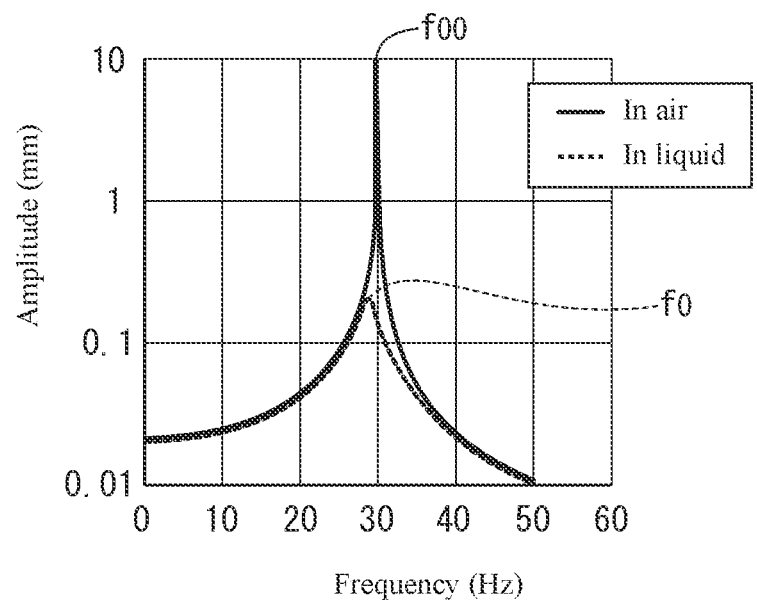
FIG. 1 is a diagram illustrating a behavior of a vibrator in the air and a behavior in a measurement liquid.

Next, preferred embodiments of the present invention will be described with reference to the drawings. First, matters considered for obtaining the viscoelasticity measuring method of the present invention will be described.

(Liquid Impedance Z)

When shear waves are propagated in a liquid with a viscosity coefficient η by vibrating a plane with a frequency f at a vibration speed v in an in-plane direction, a force T that the liquid applies to the vibrating plane (area of the vibrator) A is in proportion to the vibration speed (numerical expression 8).

$$F = AZv \qquad \text{[Numerical Expression 8]}$$

This proportional constant Z is a liquid impedance. The liquid impedance Z is a complex number of a phase angle δ, and is expressed by a numerical expression 9. j is an imaginary unit.

$$Z = |Z|e^{j\phi} \qquad \text{[Numerical Expression 9]}$$

The liquid impedance Z is obtained by solving a wave equation related to the shear waves of the liquid. On the assumption that the liquid is a Newtonian liquid and its density is ρ, a corresponding angular frequency ω=2πf, and in conclusion, the liquid impedance Z can be expressed by a numerical expression 10:

$$Z = A\sqrt{j\omega\rho\eta} = A\sqrt{\omega\rho\eta}\,e^{j\frac{\pi}{4}} = A\sqrt{\frac{\omega\rho\eta}{2}}(1+j) = R + jX \qquad \text{[Numerical Expression 10]}$$

As seen here, the liquid impedance is a complex number even in a case of a purely viscous liquid. R and X are respectively a real part and an imaginary part of the liquid impedance, and R=X in the case of a purely viscous liquid (Newtonian liquid). When the liquid is a viscoelastic body, a complex viscosity coefficient (η*) is expressed by a numerical expression 11:

$$\eta^* = \eta_{ab}e^{-j\delta} \qquad \text{[Numerical Expression 11]}$$

provided that $\eta_{ab}$ is an absolute value of the complex viscosity, and δ is a viscoelastic phase angle of the complex viscosity. The liquid impedance Z when showing complex viscosity properties satisfying this condition is expressed by a numerical Expression 12, and R≠X.

$$Z = A\sqrt{j\omega\rho\eta^*} = A\sqrt{\omega\rho\eta_{ab}}\,e^{j\left(\frac{\pi}{4}-\frac{\delta}{2}\right)}$$
$$= A\sqrt{\omega\rho\eta_{ab}}\left(\cos\left(\frac{\pi}{2}-\frac{\delta}{2}\right) + j\sin\left(\frac{\pi}{4}-\frac{\delta}{2}\right)\right) = R + jX \qquad \text{[Numerical Expression 12]}$$

$$Z = A\sqrt{j\omega\rho\eta^*} = A\sqrt{\omega\rho\eta_{ab}}\,e^{j\left(\frac{\pi}{4}-\frac{\delta}{2}\right)}$$
$$= A\sqrt{\omega\rho\eta_{ab}}\left(\cos\left(\frac{\pi}{2}-\frac{\delta}{2}\right) + j\sin\left(\frac{\pi}{4}-\frac{\delta}{2}\right)\right) = R + jX \qquad \text{[Numerical Expression 12]}$$

Therefore, a phase angle of the liquid impedance Z with the viscoelastic phase angle δ is expressed by a numerical expression 13:

$$\phi = \frac{\pi}{4} - \frac{\delta}{2} \qquad \text{[Numerical Expression 13]}$$

Here, as a measurement of vibration, depending on a type of the detection sensor, any of the values of a displacement x, a speed v, and an acceleration a is measured. A sensor output is successively expressed by differentials.

(1) When the detection sensor is a speed sensor, since a numerical expression 14 is obtained from the numerical expression 9, $$\frac{1}{Z} = \frac{1}{|Z|e^{j\phi}} = \frac{1}{|Z|}e^{-j\phi} \qquad \text{[Numerical Expression 14]}$$

the speed v is expressed by a numerical expression 15:

$$v = \frac{F}{AZ} = \frac{F}{A|Z|}e^{-j\left(\frac{\pi}{4}-\frac{\delta}{2}\right)} = \frac{F}{A|Z|}e^{-j\phi} \qquad \text{[Numerical Expression 15]}$$

and a transfer function of a sensor output is 1/AZ, and a phase angle Δ of the transfer function is Δ=−ϕ, and therefore, a relational expression of a numerical expression 16 is obtained:

$$\Delta = -\phi = -\left(\frac{\pi}{4} - \frac{\delta}{2}\right) = -\frac{\pi}{4} + \frac{\delta}{2} \qquad \text{[Numerical Expression 16]}$$

(2) When the detection sensor is a displacement sensor, from the numerical expression 15 and a numerical expression 17:

$$v = j\omega x \qquad \text{[Numerical Expression 17]}$$

a numerical expression 18 is obtained:

$$x = \frac{F}{j\omega AZ} = -\frac{F}{\omega A|Z|}e^{j\left(\frac{\pi}{2}-\phi\right)} \qquad \text{[Numerical Expression 18]}$$

A transfer function of a sensor output is 1/jωAZ, and a phase angle Δ of the transfer function is Δ=π/2−ϕ, so that a relational expression of a numerical expression 19 is obtained:

$$\Delta = \frac{\pi}{2} - \phi = \frac{\pi}{4} + \frac{\delta}{2} \qquad \text{[Numerical Expression 19]}$$

(3) When the detection sensor is an accelerometer, from the numerical expression 15 and a numerical expression 20:

$$a = j\omega^2 x \qquad \text{[Numerical Expression 20]}$$

a numerical expression 21 is obtained.

$$a = \frac{j\omega F}{AZ} = \frac{\omega F}{A|Z|}e^{j\left(\frac{\pi}{2}-\phi\right)} \qquad \text{[Numerical Expression 21]}$$

A transfer function of a sensor output is jω/AZ, and a phase angle Δ of the transfer function is Δ=π/2-φ, so that a relational expression of a numerical Expression 22 is obtained:

$$\Delta = \frac{\pi}{2} - \phi = \frac{\pi}{4} + \frac{\delta}{2}$$ [Numerical Expression 22]

In this way, by obtaining a phase angle φ of the liquid impedance or a phase angle Δ of a transfer function, according to a type of the detection sensor, a viscoelastic phase angle δ can be obtained from the numerical expression 16, numerical expression 19, and numerical expression 22.

(Consideration of Vibration Equation of Vibrator)

A mechanical vibrator is configured by coupling a mass object (mass M) to the other end of a spring (spring constant K) whose one end is fixed, and resonates when a numerical expression 23 is satisfied in a case where the fixed end is vibrated by a force of a period f $$f = \frac{1}{2\pi}\sqrt{\frac{K}{M}} = f0$$ [Numerical Expression 23]

f0 is a resonance frequency. The mechanical vibrator has an internal resistance r although it is very small. As the frequency becomes close to the resonance frequency f0, the amplitude suddenly becomes large, and when f=f0, the amplitude reaches a maximum amplitude. When f≥0, the amplitude decreases as the frequency increases. In a low frequency range, a phase delay is 0, however, as the frequency becomes close to the resonance frequency f0, the phase delay suddenly appears, and becomes a ¼ period (90-degree delay) when f=f0. When f≥0, the delay further increases, and approaches a ½ period (180-degree delay) as the frequency increases. Hereinafter, with respect to the resonance frequency f0, a resonance frequency of the vibrator in the air is represented as $f_{00}$, and resonance when influenced by the liquid is represented as $f_0$.

(Behavior of Vibrator in Liquid)

Figure 2:
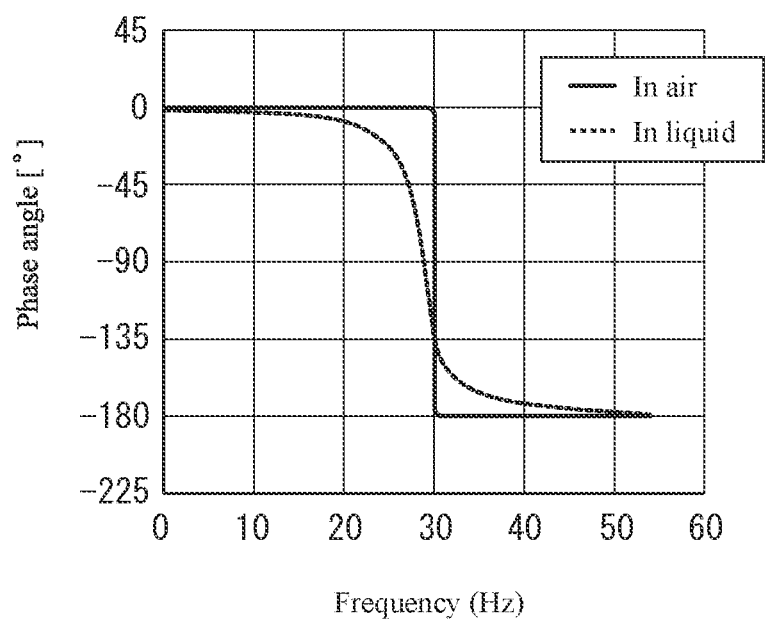
FIG. 2 is a diagram illustrating a behavior of a vibrator in the air and a behavior in a measurement liquid.
Figure 3:
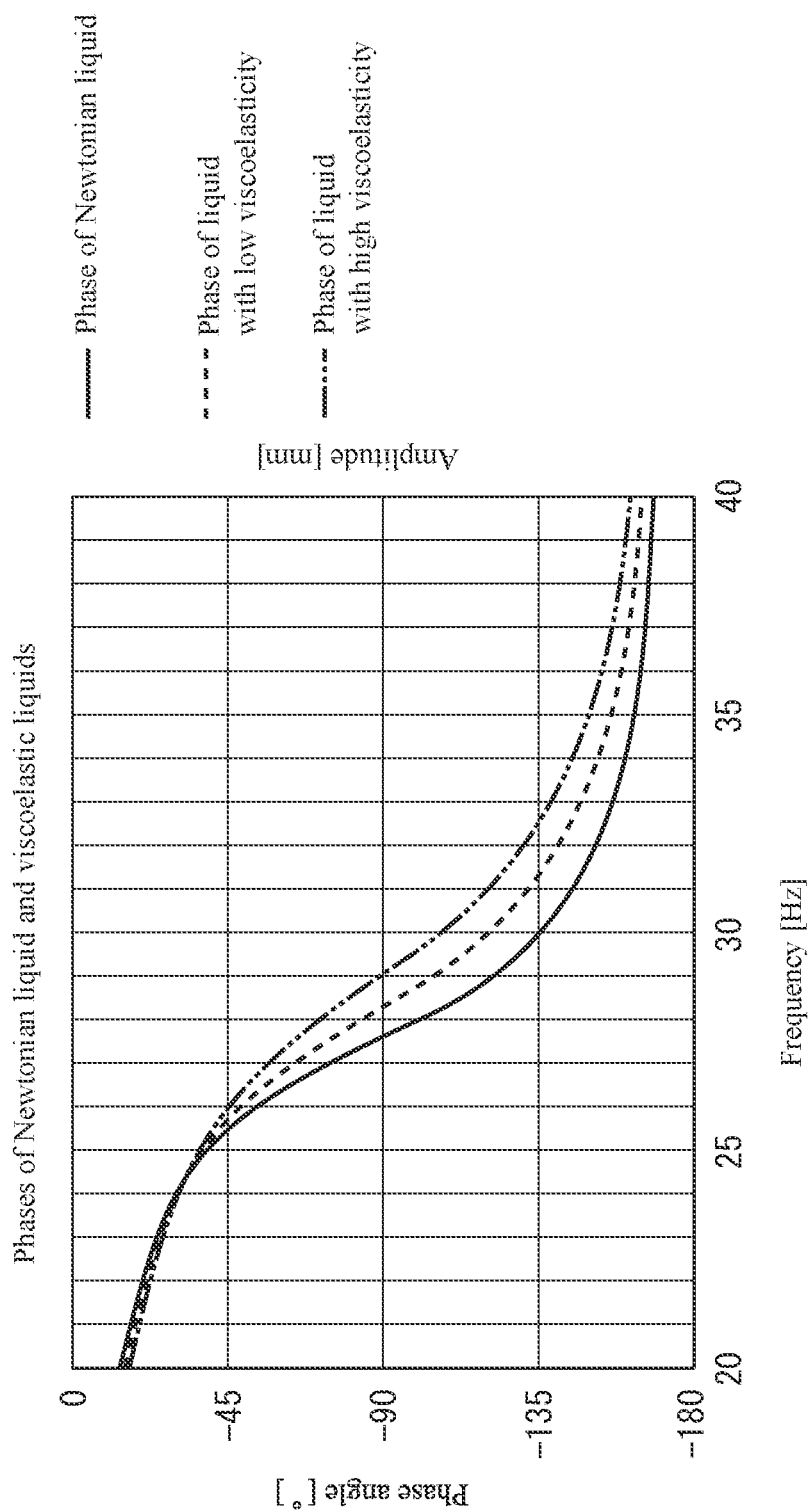
FIG. 3 is a diagram illustrating phase changes of a Newtonian liquid and viscoelastic liquids.

FIGS. 1 and 2 are diagrams illustrating a behavior of a vibrator in the air and a behavior in a liquid, and FIG. 3 is a diagram illustrating phase changes of a Newtonian liquid and viscoelastic liquids. In FIG. 1, the horizontal axis represents frequency f [Hz], and the vertical axis represents amplitude x [mm]. From FIG. 1, a resonance frequency $f_{00}$ of the vibrator in the air has a clearer peak than a resonance frequency $f_0$ in a liquid, and the resonance frequency $f_{00}$ in the air (and corresponding resonance frequency $\omega_{00}$) can also be considered as an important frequency. An amplitude $x_{00}$ of the resonance frequency $f_{00}$ of the vibrator in the air can be more easily and more accurately measured by the technology of FFT (Fast Fourier Transform), etc., than in a liquid.

In FIG. 2, with respect to a Newtonian liquid, the horizontal axis represents frequency f [Hz] and the vertical axis represents phase angle Δ [°] of a transfer function.

In FIG. 3, the horizontal axis represents frequency f [Hz] and the vertical axis represents phase angle Δ [°] of a transfer function. As illustrated in FIG. 3, when the vibrator is subjected to viscous resistance sufficiently larger than internal resistance, in a Newtonian liquid, there is a singular point that the phase invariably passes ($f_{00}$, −135°), and this point shifts to ($f_{00}$, −135°+δ/2) in a complex viscous liquid. In quadrature detection, the third quadrant becomes the first quadrant, so that the pass point is ($f_{00}$, A)=($f_{00}$, π/4+δ/2). That is, by measuring a phase angle Δ of a transfer function, a viscoelastic phase angle δ of a measurement liquid is obtained.

(Equation of Vibration in Air)

K represents a spring constant of the vibrator, M represents a mass of the mass object, and r represents internal resistance. When "x" represents a displacement of the mass object, "v" represents a speed, "a" represents an acceleration, and F represents a driving force for the mass object, an equation of vibration is a numerical expression 24 in consideration of force balance.

[Numerical expression 24]

$$F = M\ddot{x} + r\dot{x} + Kx = -\omega^2 M x + j\omega r x + Kx$$

$$= M\left(-\omega^2 + \frac{j\omega r}{M} + \frac{K}{M}\right)x = M\left(\omega_{00}^2 - \omega^2 + \frac{j\omega r}{M}\right)x$$

$$= M\sqrt{(\omega_{00}^2 - \omega^2)^2 + \left(\frac{\omega r}{M}\right)^2} e^{j\Delta_0}x$$

Here, a phase angle $\Delta_0$ of a transfer function of the vibrator in the air is expressed by a numerical expression 25:

$$\tan\Delta_0 = \frac{\omega\frac{r}{M}}{\omega_{00}^2 - \omega^2}$$ [Numerical expression 25]

(Equation of Vibration in Liquid)

When a liquid impedance is Z=R+jX, a driving force necessary for the vibrator that has an area A and is driven at a vibration speed v is expressed by a numerical expression 26:

F=AZv=A(R+jX)v=
A(R+jX)jωx=−ωAXx+jωARx [Numerical Expression 26]

and the numerical expression 24 and numerical expression 25 become a numerical expression 27 and a numerical expression 28:

[Numerical expression 27]

$$F = \left(-\omega^2 M - \omega AX + j\omega(r + AR) + K\right)x$$

$$= M\left(-\omega^2 - \omega\frac{AX}{M} + j\omega\frac{r + AR}{M} + \frac{K}{M}\right)x$$

$$= M\left(\omega_{00}^2 - \omega^2 - \omega\frac{AX}{M} + j\omega\frac{r + AR}{M}\right)x$$

$$= M\sqrt{\left(\omega_{00}^2 - \omega^2 - \omega\frac{AX}{M}\right)^2 + \left(\omega\frac{r + AR}{M}\right)^2} e^{j\phi}x$$

$$\tan\phi = \frac{\omega\frac{r + AR}{M}}{\omega_{00}^2 - \omega^2 - \omega\frac{AX}{M}}$$ [Numerical expression 28]

(Comparison with Conventional Technology)

Figure 4:
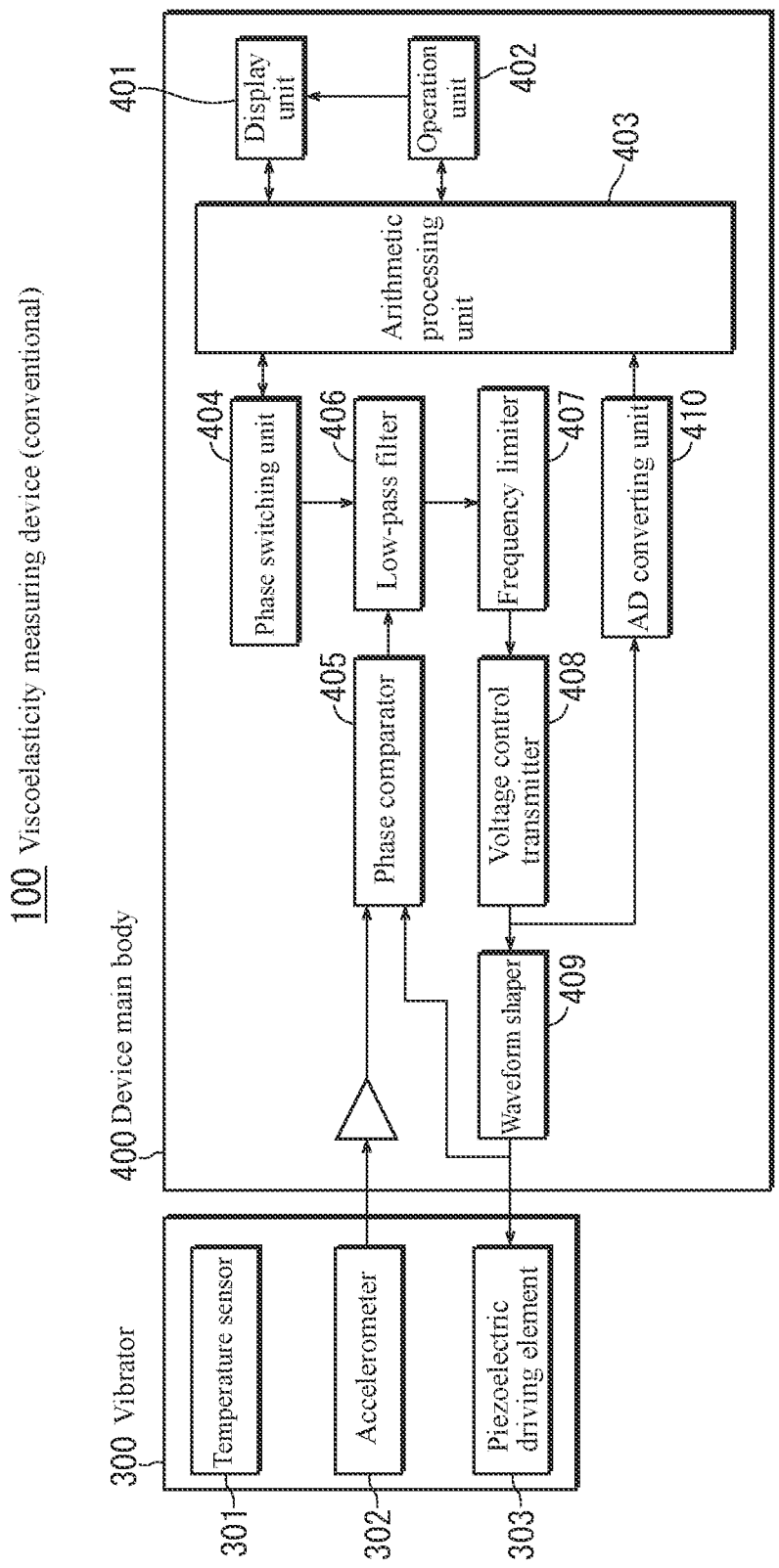
FIG. 4 is a configuration block diagram of a viscoelasticity measuring device of a conventional technology.

Here, for comparison with the present invention, a viscoelasticity measuring method as a conventional technology described in Patent Literature 3 will be introduced. FIG. 4 is a configuration block diagram of a viscoelasticity measuring device 100 as a conventional technology described in Patent Literature 3. A vibrator 300 includes a temperature sensor 301, an accelerometer 302, and a piezoelectric driving element 303. A device main body 400 includes a display unit 401, an operation unit 402, an arithmetic processing unit 403, a phase switching unit 404, a phase comparator 405, a low-pass filter 406, a frequency limiter 407, a voltage control transmitter 408, a waveform shaper 409, and an AD converting unit 410.

The arithmetic processing unit 403 outputs a drive signal. The drive signal is controlled to a transmission frequency with a certain phase angle through the phase switching unit 404, the low-pass filter 406, the frequency limiter 407, and the voltage control transmitter 408, and output to the piezoelectric driving element 303 through the waveform shaper 409. In response to vibration of the piezoelectric driving element 303, the vibrator 300 vibrates. The accelerometer 302 senses an angular acceleration of the vibrator 300, and amplifies and outputs this as an output signal to the phase comparator 405. The phase comparator 405 compares a drive signal branched from the waveform shaper 409 and the output signal, and performs control so that the output signal and the drive signal always have a predetermined phase difference from each other. The arithmetic processing unit 403 switches the phase angle by controlling the phase switching unit 404.

The viscoelasticity measuring method described in Patent Literature 3 uses the configuration described above, and uses three special frequencies (angular frequencies $\omega_1$, $\omega_0$, and $\omega_2$). The angular frequencies $\omega_1$, $\omega_0$, and $\omega_2$ are respectively frequencies when a phase difference A of a transfer function becomes $\pi/4$, $\pi/2$, and $3\pi/4$, and are respectively $\omega_{45}$, $\omega_{90}$, and $\omega_{135}$. tan $\phi$ corresponding to the three phase differences are respectively 1, $\infty$, and 1, and in consideration of the numerical expression 28, equations of the vibrations in the liquid can be expressed as a numerical expression 29, a numerical expression 30, and a numerical expression 31:

$$\omega_{00}^2 - \omega_1^2 - \omega_1 \frac{AX + AR + r}{M} = 0 \quad \text{[Numerical Expression 29]}$$

$$\omega_{00}^2 - \omega_0^2 - \omega_0 \frac{AX}{M} = 0 \quad \text{[Numerical Expression 30]}$$

$$\omega_{00}^2 - \omega_2^2 - \omega_2 \frac{X - R - r}{M} = 0 \quad \text{[Numerical Expression 31]}$$

In Patent Literature 3, the vibrator 300 is controlled and vibrated at the respective frequencies by a PLL circuit by a constant driving force, and respective resonance frequencies $f_{45}$, $f_{90}$, and $f_{135}$ are measured, and a real part R of a liquid impedance is obtained from measurement values of $f_{45}$ and $f_{135}$, and an imaginary part X is obtained from a measurement value of $f_{960}$ by a simultaneous equation in which R and X are unknown numbers. As a result, a numerical expression 32 is obtained:

$$\sqrt{\omega_0 \rho \eta_{ab}} = \sqrt{R^2 + X^2} \quad \text{[Numerical Expression 32]}$$

and an absolute value $\eta_{ab}$ of a complex viscosity is obtained from a numerical expression 33:

$$\eta_{ab} = \frac{R^2 + X^2}{\omega_0 \rho} \quad \text{[Numerical Expression 33]}$$

A numerical expression 35 is obtained from a numerical expression 34 and the numerical expression 13, and a viscoelastic phase angle $\delta$ is obtained from the numerical expression 35:

$$\phi = \tan^{-1} \frac{X}{R} \quad \text{[Numerical Expression 34]}$$

$$\delta = \frac{\pi}{2} - 2\tan^{-1} \frac{X}{R} \quad \text{[Numerical Expression 35]}$$

According to the viscoelasticity measuring method described in Patent Literature 3, measurements are made at different frequencies, that is, at least three frequencies, and elements related to the liquid impedance are obtained from functions of R and X. In addition, the vibrator 300 is immersed in a measurement liquid and a resonant condition is maintained by the PLL (Phase Locked Loop) circuit, so that a precise and expensive PLL circuit is necessary for obtaining measurement accuracy.

(Viscoelasticity Measuring Method of Present Invention)

On the other hand, a viscoelasticity measuring method of the present invention is as follows.

When the vibrator is driven at a resonance angular frequency $\omega_{00}$ ($\omega_{00} = 2\pi f_{00}$) in the air, a method in which a phase angle is calculated from a ratio of R and X as in the numerical expression 34 cannot be used, and a signal phase difference A between a drive signal and a sensor output signal is measured.

(Method 1)

In a case where internal resistance r of the vibrator is small and negligible, a displacement, that is, an amplitude x when the vibrator is driven at an angular frequency $\omega_{00}$ in a liquid is expressed by a numerical expression 36 (provided that $x_{00}$ is an amplitude value of x at the angular frequency $\omega_{00}$).

$$x = -\frac{F}{\omega_{00}\sqrt{X^2 + R^2}} e^{j\left(\frac{\pi}{4} + \frac{\delta}{2}\right)} = \quad \text{[Numerical Expression 36]}$$

$$-\frac{F}{\omega_{00}\sqrt{\omega_{00}\rho\eta_{ab}}} e^{j\left(\frac{\pi}{4} + \frac{\delta}{2}\right)}$$

$$x_{00} = \frac{F}{\omega_{00}\sqrt{X^2 + R^2}} = \frac{F}{\omega_{00}\sqrt{\omega_{00}\rho\eta_{ab}}}$$

The phase difference A is expressed by a numerical expression 37.

$$\Delta = \frac{\pi}{4} + \frac{\delta}{2} \quad \text{[Numerical Expression 37]}$$

Therefore, by measuring the amplitude $x_{00}$, an absolute value $\eta_{ab}$ is obtained from the numerical expression 36, and by measuring the phase difference A, a viscoelastic phase angle $\delta$ is obtained from the numerical expression 37.

(Method 2)

$$F = F_0 \sin \omega_{00} t \quad \text{[Numerical Expression 38]}$$

Here, by orthogonally transforming a sensor output signal of a displacement sensor of the vibrator driven by a driving force F expressed by a numerical expression 38 provided that $F_0$ is an amplitude of the driving force, an in-phase component I in phase with driving and a quadrature component Q orthogonal to driving are created. Data is written as (I, Q). When internal resistance r of the vibrator is negligible, in a case where A represents an area of the vibrator and a gain of the device is 1, A is expressed by the numerical expression 37, so that (I, Q) are respectively expressed by a numerical expression 39 and a numerical expression 40:

$$I = \frac{F}{2\omega_{00}\sqrt{X^2 + R^2}} \cos\Delta \quad \text{[Numerical Expression 39]}$$

$$Q = \frac{F}{2\omega_{00}\sqrt{X^2 + R^2}} \sin\Delta \quad \text{[Numerical Expression 40]}$$

Therefore, from the numerical expression 41:

$$\sqrt{I^2 + Q^2} = \frac{F}{2\omega_{00}\sqrt{X^2 + R^2}} = \frac{F}{2\omega_{00}\sqrt{\omega_{00}\rho\eta_{ab}}} \quad \text{[Numerical Expression 41]}$$

an absolute value $\eta_{ab}$ is obtained as expressed by a numerical expression 42:

$$\eta_{ab} = \frac{F^2}{4\omega_{00}^3 \rho (I^2 + Q^2)} \quad \text{[Numerical Expression 42]}$$

A phase angle $\Delta$ is obtained from a numerical expression 43:

$$\Delta = \tan^{-1}\frac{Q}{I} = \frac{\pi}{4} + \frac{\delta}{2} \quad \text{[Numerical Expression 43]}$$

a viscoelastic phase angle $\delta$ is obtained as expressed by a numerical expression 44:

$$\delta = 2\tan^{-1}\frac{Q}{I} - \frac{\pi}{2} \quad \text{[Numerical Expression 44]}$$

(Method 3)

In a case of a low-viscosity liquid, internal resistance r of the vibrator is not negligible, and the (Method 2) cannot be used. (I, Q) are expressed by a numerical expression 45 and a numerical expression 46. A method for eliminating "r" from these will be shown. A value of r is measured in advance with (I, Q) in the air.

$$I = \frac{F}{2\omega_{00}\sqrt{X^2 + (R+r)^2}} \cos\Delta \quad \text{[Numerical Expression 45]}$$

$$Q = \frac{F}{2\omega_{00}\sqrt{X^2 + (R+r)^2}} \sin\Delta \quad \text{[Numerical Expression 46]}$$

Based on a numerical expression 47 and a numerical expression 48, $\eta_{ab}$ and $\delta$ are obtained from a numerical expression 49 and a numerical expression 50.

$$\sqrt{I_3^2 + Q_3^2} = \frac{F}{2\omega_{00}\sqrt{\omega_{00}\rho\eta_{ab}}} \quad \text{[Numerical Expression 47]}$$

$$\Delta = \tan^{-1}\frac{Q_3}{I_3} \quad \text{[Numerical Expression 48]}$$

$$\eta_{ab} = \frac{F^2}{4\omega_{00}^3 \rho (I_3^2 + Q_3^2)} \quad \text{[Numerical Expression 49]}$$

$$\delta = 2\tan^{-1}\left(\frac{Q_3}{I_3}\right) - \frac{\pi}{2} \quad \text{[Numerical Expression 50]}$$

Here, $$I + jQ = \frac{F}{2\omega_{00}\sqrt{X^2 + (R+r)^2}} e^{j\Delta} = \quad \text{[Numerical Expression 51]}$$

$$\frac{F}{2\omega_{00}\sqrt{X^2 + (R+r)^2} \, e^{-j\Delta}} =$$

$$\frac{F}{2\omega_{00}(X - j(R+r))}$$

$$\frac{1}{I + jQ} = \quad \text{[Numerical Expression 52]}$$

$$\frac{I - jQ}{I^2 + Q^2} = \frac{2\omega_{00}(X - j(R+r))}{F}$$

Step 1: Reciprocals $(I_1, Q_1)$ of $(I, Q)$ are created as expressed by a numerical expression 53 and a numerical expression 54:

$$I_1 = \frac{I}{I^2 + Q^2} = \frac{2\omega_{00}}{F} X \quad \text{[Numerical Expression 53]}$$

$$Q_1 = \frac{-Q}{I^2 + Q^2} = \frac{2\omega_{00}}{F}(R + r) \quad \text{[Numerical Expression 54]}$$

Step 2: Functions $(I_2, Q_2)$ are created as expressed by a numerical expression 55 and a numerical expression 56:

$$I_2 = I_1 \quad \text{[Numerical Expression 55]}$$

$$Q_2 = Q_1 + \frac{2\omega_{00}}{F}r = -\frac{2\omega_{00}}{F}R \quad \text{[Numerical Expression 56]}$$

Step 3: Functions $(I_3, Q_3)$ are created as expressed by a numerical expression 57 and a numerical expression 58:

$$I_3 = \frac{I_2}{I_2^2 + Q_2^2} = \frac{FX}{2\omega_{00}(X^2 + R^2)} \quad \text{[Numerical Expression 57]}$$

$$Q_3 = \frac{-Q_2}{I_2^2 + Q_2^2} = \frac{FR}{2\omega_{00}(X^2 + R^2)} \quad \text{[Numerical Expression 58]}$$

Here, in consideration of the relationship of a numerical expression 59:

$$I_3 + jQ_3 = \quad \text{[Numerical Expression 59]}$$

$$\frac{F(X + jR)}{2\omega_{00}(X^2 + R^2)} = \frac{F(X + jR)}{2\omega_{00}(X + jR)(X - jR)} =$$

$$\frac{F}{2\omega_{00}\sqrt{X^2 + R^2}}(\cos\Delta + j\sin\Delta)$$

a numerical expression 60 is derived:

$$I_3 = \quad \text{[Numerical Expression 60]}$$

$$\frac{F}{2\omega_{00}\sqrt{X^2 + R^2}}\cos\Delta = \frac{F}{2\omega_{00}\sqrt{\omega_{00}\rho\eta_{ab}}}\cos\Delta$$

$$Q_3 = \frac{F}{2\omega_{00}\sqrt{X^2 + R^2}}\sin\Delta = \frac{F}{2\omega_{00}\sqrt{\omega_{00}\rho\eta_{ab}}}\sin\Delta$$

and accordingly, a numerical expression 61 and a numerical expression 62 are obtained, and $\eta_{ab}$ and $\delta$ are obtained from a numerical expression 63 and a numerical expression 64:

$$\sqrt{I_3{}^2 + Q_3{}^2} = \frac{F}{2\omega_{00}\sqrt{\omega_{00}\rho\eta_{ab}}} \quad \text{[Numerical Expression 61]}$$

$$\Delta = \tan^{-1}\frac{Q_3}{I_3} \quad \text{[Numerical Expression 62]}$$

$$\eta_{ab} = \frac{F^2}{4\omega^3{}_{00}\rho(I_3{}^2 + Q_3{}^2)} \quad \text{[Numerical Expression 63]}$$

$$\delta = 2\tan^{-1}\left(\frac{Q_3}{I_3}\right) - \frac{\pi}{2} \quad \text{[Numerical Expression 64]}$$

Therefore, it could be confirmed that, even in the case of a low-viscosity liquid, the same result as in the numerical expression 42 and the numerical expression 44 used when internal resistance r is negligible was obtained.

The consideration described above was made when the detection sensor was a displacement sensor. A sensor output is successively expressed by differentials, so that a relational expression of a viscoelastic phase angle $\delta$ and a phase angle $\Delta$ of a transfer function is converted as described above. Also, with respect to an absolute value $\eta_{ab}$ of a complex viscosity, (1) when the detection sensor is a displacement sensor, a relational expression of a numerical expression 65 is obtained from the relational expression of the numerical expression 18:

$$\sqrt{I^2 + Q^2} = \frac{F}{2\omega_{00}\sqrt{\omega_{00}\rho\eta_{ab}}} \quad \text{[Numerical Expression 65]}$$

(2) when the detection sensor is a speed sensor, a relational expression of a numerical expression 66 is obtained from the relational expression of the numerical expression 15:

$$\sqrt{I^2 + Q^2} = \frac{F}{2\sqrt{\omega_{00}\rho\eta_{ab}}} \quad \text{[Numerical Expression 66]}$$

(3) when the detection sensor is an accelerometer, a relational expression of a numerical expression 67 is obtained from the relational expression of the numerical expression 21:

$$\sqrt{I^2 + Q^2} = \frac{\omega_{00}F}{2\sqrt{\omega_{00}\rho\eta_{ab}}} \quad \text{[Numerical Expression 67]}$$

When an absolute value $\eta_{ab}$ and a viscoelastic phase angle $\delta$ of a complex viscosity can be obtained, from a numerical expression 68, a numerical expression 69, a numerical expression 70, and a numerical expression 71 described below as known relational expressions of a viscoelastic liquid, a complex viscosity coefficient $\eta^*$ and a complex rigidity modulus $G^*$ can be obtained.

$$\eta^* = \eta - j\frac{G}{\omega} = \eta' - j\eta'' = \eta_{ab}e^{-j\delta} \quad \text{[Numerical Expression 68]}$$

$$\eta_{ab} = \sqrt{\eta'^2 + \eta''^2} \quad \text{[Numerical Expression 69]}$$

$$\tan\delta = \frac{\eta''}{\eta'} \quad \text{[Numerical Expression 70]}$$

$$G^* = j\omega\eta^* \quad \text{[Numerical Expression 71]}$$

Therefore, in a viscoelasticity measuring method of the present invention:
(a) A vibrator is driven at a resonance frequency $f_{00}$ in the air.
(b) An absolute value $\eta_{ab}$ of a complex viscosity is obtained by measuring an amplitude $x_{00}$ of the vibrator under the condition (a) as described above in a measurement liquid, or by measuring a signal phase delay $\Delta$ of a sensor output signal with respect to a drive signal when the vibrator is driven under the condition (a) from the values of I, Q.
(c) A viscoelastic phase angle $\delta$ is obtained by measuring a signal phase delay $\Delta$ of a sensor output signal with respect to a drive signal. The signal phase delay $\Delta$ is obtained by driving the vibrator under the condition (a) in a measurement liquid and directly measuring a voltage difference or by a measurement from the values of I, Q.

Based on the consideration described above, viscoelasticity measuring methods according to embodiments of the present invention will be described.

First Embodiment

Figure 5:
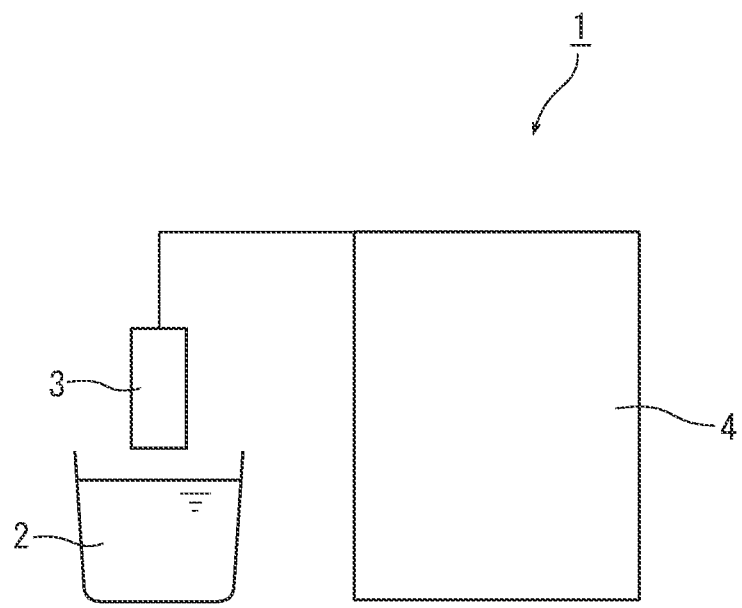
FIG. 5 is an entire schematic view of a viscoelasticity measuring device according to a first embodiment.

The present embodiment is based on the ideas of (Method 2) and (Method 3) described above. FIG. 5 is an entire schematic view of a viscoelasticity measuring device according to a first embodiment of the present invention. The viscoelasticity measuring device 1 includes a vibrator 3, and a device main body 4 supporting the vibrator 3. The reference sign 2 denotes a measurement liquid.

Figure 6A:
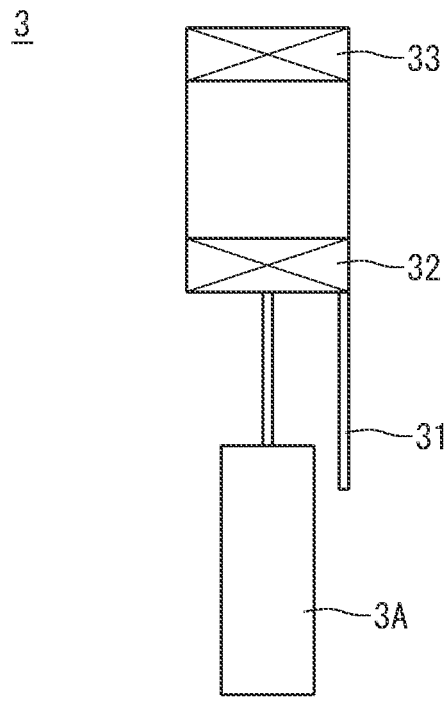
FIG. 6A is a view illustrating an example of a vibrator that can be used for the viscoelasticity measuring device.
Figure 6B:
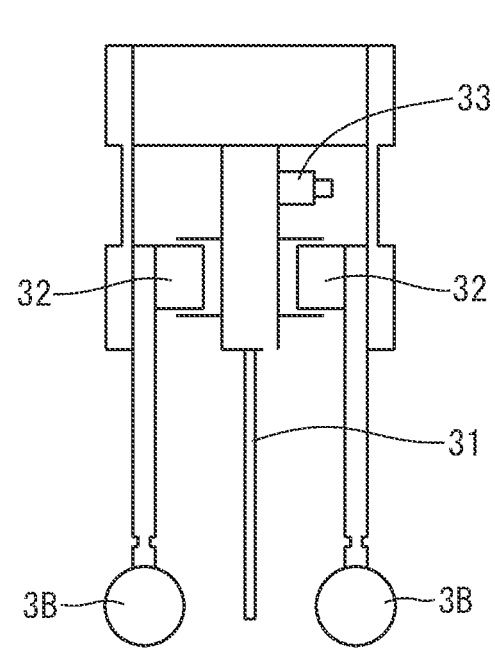
FIG. 6B is a view illustrating an example of a vibrator that can be used for the viscoelasticity measuring device.

The vibrator 3 is a mechanical vibrator which has a mass object coupled to the other end of a spring having one fixed end, and has a resonance frequency. FIGS. 6A and 6B are views illustrating examples of the vibrator 3 that can be used for the viscoelasticity measuring device 1.

FIG. 6A illustrates a vibrator 3 used in rotational vibration type viscometers. The vibrator 3 described here includes one inspector 3A below an axis, and includes a driving unit 32 and a detection sensor 33 above the axis. A temperature sensor 31 is hung down to a position where the temperature sensor 31 does not influence vibration of the inspector 3A. The driving unit 32 reciprocates the inspector 3A with a constant turning angle around the axis. The detection sensor 33 detects a vibration change in a rotation direction of the inspector 3A. FIG. 6B illustrates a vibrator 3 used in tuning fork vibration viscometers. The vibrator 3 described herein includes a pair of tuning-fork-type inspectors 3B hung down from a central support body. To each inspector 3B, a driving unit 32 is attached, and to the central support body, a detection sensor 33 is attached. A temperature sensor 31 is hung down to a position where the temperature sensor 31 does not influence vibrations of the inspectors 3B. The driving unit 32 vibrates the inspectors 3B in opposite phases. The detection sensor 33 detects vibration changes in reciprocation directions of the inspectors 3B.

FIGS. 6A and 6B are just examples, and as the vibrator 3 of the present embodiment, a bending vibrator, a torsional vibrator, a telescopic vibrator, a surface wave vibrator, etc., may be employed. As the driving unit 32, a piezoelectric drive system, a conductive drive system, a magnetostrictive drive system, etc., may be employed as long as it can apply vibration to the inspector. As the detection sensor 33, a displacement sensor, a speed sensor, an accelerometer, etc., may be employed. As a sensing means, a piezoelectric sensor, a conductive sensor, a static sensor, an optical sensor, a magnetic sensor, etc., may be employed.

Figure 7:
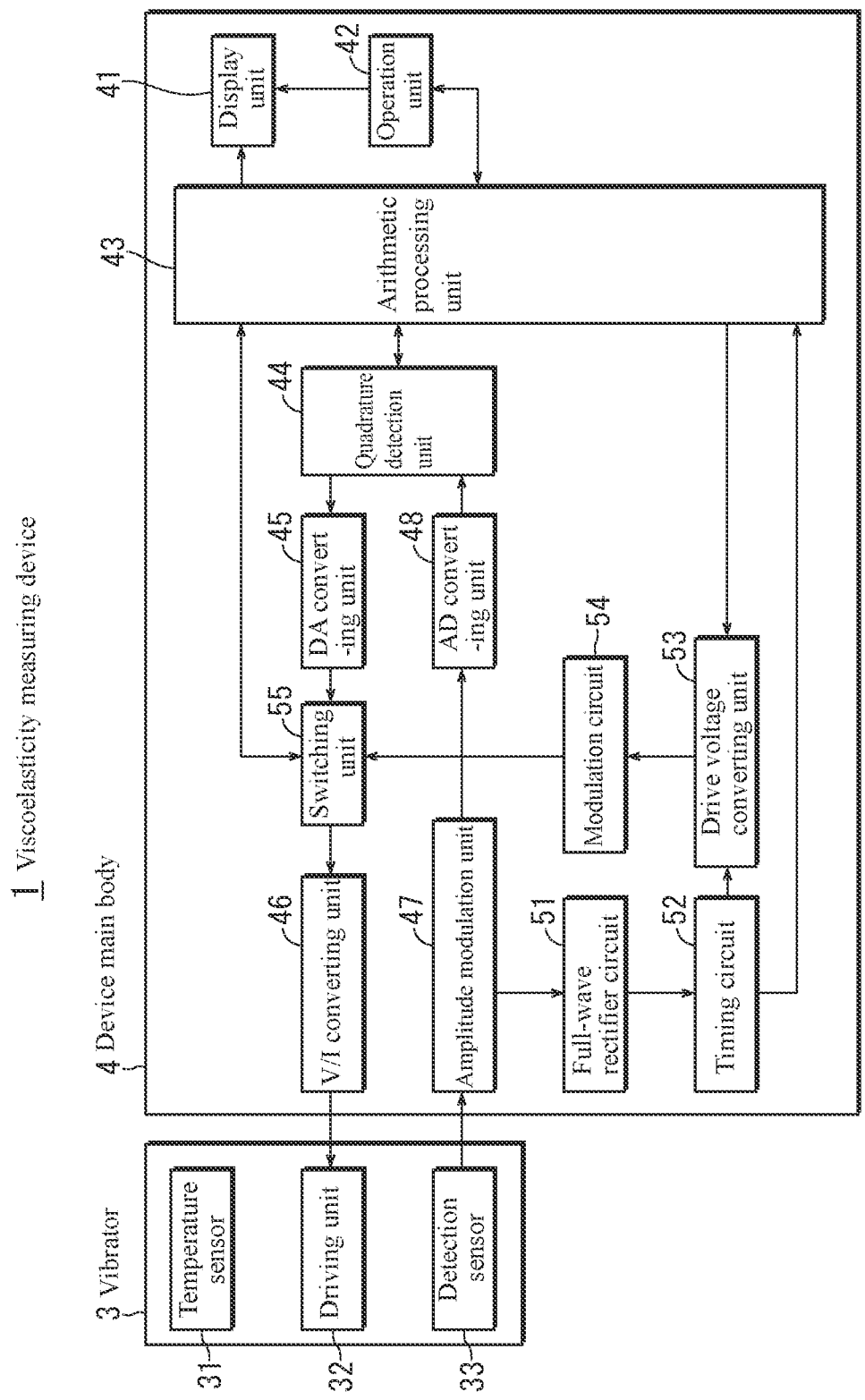
FIG. 7 is a configuration block diagram of the viscoelasticity measuring device.

FIG. 7 is a configuration block diagram of the viscoelasticity measuring device 1. The vibrator 3 includes the above-described temperature sensor 31, driving unit 32, and detection sensor 33. The device main body 4 includes a display unit 41, an operation unit 42, an arithmetic processing unit 43, a quadrature detection unit 44, a DA converting unit 45, a V/I converting unit 46, an amplitude modulation unit 47, and an AD converting unit 48. In addition, the device main body 4 includes a full-wave rectifier circuit 51, a timing circuit 52, a drive voltage converting unit 53, a modulation circuit 54, and a switching unit 55. The reference signs 43 to 48 denote elements for viscoelasticity measurement, and are essential elements of the present embodiment. The reference signs 51 to 54 denote elements for amplitude determination, and are optional elements of the present embodiment. The switching unit 55 is an element for switching from amplitude determination to viscoelasticity measurement.

The arithmetic processing unit 43 is a control unit configured by mounting at least a CPU and a memory (RAM, ROM, etc.) on an integrated circuit. Operation of the arithmetic processing unit 43 will be described by taking a case where the driving unit 32 is a force coil, and the detection sensor 33 is a displacement sensor.

First, amplitude determination will be described. The arithmetic processing unit 43 outputs a signal to the drive voltage converting unit 53. The drive voltage converting unit 53 outputs a drive voltage based on a sine wave output from the timing circuit 52. The drive voltage is subjected to pulse width modulation by the modulation circuit 54 (a set amplitude of the vibrator 3 is arbitrarily changed here in response to a command from the arithmetic processing unit 43) and output to the V/I converting unit 46, and converted from the drive voltage into a drive current and applied to the driving unit 32. The driving unit 32 receives the drive current and vibrates the vibrator 3, and the detection sensor 33 detects a displacement (amplitude) of the vibrator 3, and places the detected displacement on a carrier wave and outputs this as a signal to the amplitude modulation unit 47. This signal is taken out as a displacement signal of a certain frequency in the amplitude modulation unit 47, rectified in the full-wave rectifier circuit 51, becomes a sine wave in the timing circuit 52, and is input into the arithmetic processing unit 43. The arithmetic processing unit 43 transmits a signal to the vibrator 3 until the displacement signal becomes constant. When the displacement signal becomes constant, that is, when the vibrator 3 reaches a predetermined amplitude, the arithmetic processing unit 43 records a value of a drive current at this time. It is also possible that the arithmetic processing unit 43 directly measures a viscosity of the measurement liquid 2 by utilizing the fact that the drive current value has a proportional relationship to a viscosity value. A liquid temperature of the measurement liquid 2 detected by the temperature sensor 31 is converted into a digital signal by an AD converting unit not illustrated, and input into the arithmetic processing unit 43.

Next, viscoelasticity measurement will be described. The arithmetic processing unit 43 outputs a signal to the quadrature detection unit 44. The quadrature detection unit 44 is a control unit configured by mounting at least a CPU and a memory (RAM, ROM, etc.) on an integrated circuit. The quadrature detection unit 44 outputs a signal (this signal is a "drive signal") corresponding to a drive current recorded in a viscosity measurement described above. The drive signal is converted into an analog signal by the DA converting unit 45 and converted into a drive current by the V/I converting unit 46, and is applied to the driving unit 32. The driving unit 32 receives the drive current and resonates the vibrator 3. The detection sensor 33 detects a resonance amplitude of the vibrator 3, and places the resonance amplitude on a carrier wave and outputs this (this is a "sensor output signal") to the amplitude modulation unit 47. The sensor output signal is taken out as a displacement signal of a certain frequency by the amplitude modulation unit 47, converted into a digital signal by the AD converting unit 48, and returns to the quadrature detection unit 44. The quadrature detection unit 44 performs quadrature detection of the sensor output signal, generates a complex baseband signal (an in-phase component I in phase with the drive signal and a quadrature component Q orthogonal to the drive signal), and outputs this signal to the arithmetic processing unit 43. From the values of I, Q obtained in the quadrature detection unit 44, the arithmetic processing unit 43 measures a signal phase delay $\Delta$ (can also be called a phase angle $\Delta$ of a transfer function) of the sensor output signal with respect to the drive signal, and calculates a viscoelastic phase angle $\delta$ based on the signal phase delay $\Delta$. The arithmetic processing unit 43 also calculates an absolute value $n_{ab}$ of a complex viscosity from the values of I, Q. In addition, the arithmetic processing unit 43 calculates a complex viscosity coefficient $\eta^*$ and a complex rigidity modulus $G^*$ from the absolute value $\eta_{ab}$ and the viscoelastic phase angle $\delta$.

The display unit 41 has a liquid crystal screen, and includes a touch-panel-type operation unit 42. On the liquid crystal screen, a screen related to a measurement application is displayed, and an operator is guided by the screen and can execute viscosity measurement and viscoelasticity measurement applications. The operation unit 42 and the display unit 41 may be provided so that their configurations are separated from each other.

Figure 8:
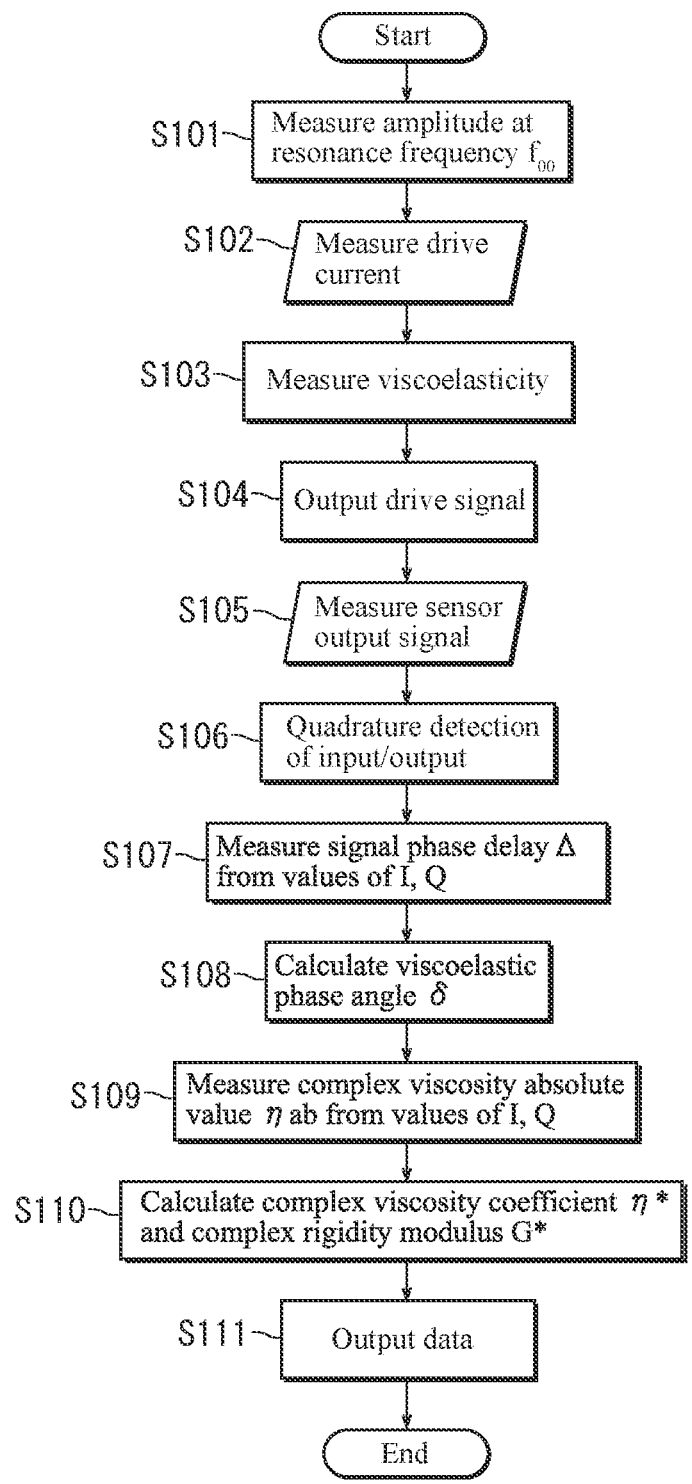
FIG. 8 is a flowchart of a viscoelasticity measuring method according to the first embodiment.

The viscoelasticity measuring method according to the present embodiment is performed as follows. FIG. 8 is a flowchart of the viscoelasticity measuring method according to the first embodiment. As an in-advance step, a measuring operator measures a resonance frequency $f_{00}$ of the vibrator 3 in the air by FFT (Fast Fourier Transform) or the like.

When a measurement is started, the processing shifts to Step S101, and first, the vibrator 3 is vibrated at the resonance frequency $f_{00}$ in the measurement liquid 2. Next, the processing shifts to Step S102, and a drive current when an amplitude of the vibrator 3 becomes constant is measured and recorded. Next, the processing shifts to Step S103, and moves on to a viscoelasticity measurement. Subsequently, in Step S104, a drive signal voltage corresponding to the drive current stored in Step S102 is output. Next, the processing shifts to Step S105, and a sensor output signal is measured from the detection sensor 33. Next, the processing shifts to Step S106, and quadrature detection of the sensor output signal is performed in the quadrature detection unit 44, and values of I, Q are obtained. Next, the processing shifts to Step S107, and in the arithmetic processing unit 43, a signal phase delay (phase angle $\Delta$ of transfer function) is measured from the values of I, Q. Next, the processing shifts to Step S108, and the arithmetic processing unit 43 calculates a viscoelastic phase angle $\delta$ of the measurement liquid 2 from the phase angle $\Delta$. Next, the processing shifts to Step S109, and the arithmetic processing unit 43 calculates an absolute value $\eta_{ab}$ of a complex viscosity from the values of I, Q. Next, the processing shifts to Step S110, and the arithmetic processing unit 43 calculates a complex viscosity coefficient $\eta^*$ and a complex rigidity modulus $G^*$ from the absolute value $\eta_{ab}$ and the viscoelastic phase angle $\delta$. Then, the processing shifts to Step S111, and after the respective calculation data are output to the display unit 41, etc., the measurement is ended.

Steps S101 and S102 for the drive current measurement may be omitted by reading or inputting a value of a drive current obtained on a different date and time under the same environmental conditions. Steps S101 and S102 are optional steps in the present embodiment.

As above, according to the viscoelasticity measuring method of the present embodiment and the viscoelasticity measuring device 1 for the method, (i) The number of measurement points is only one according to a resonance frequency $f_{00}$ (single frequency).
(ii) An absolute value $\eta_{ab}$ and a viscoelastic phase angle $\delta$ of a complex viscosity are obtained based on values of I, Q obtained by quadrature detection of a sensor output signal.
(iii) Vibration control is performed upon grasping a resonant drive current by using a resonance frequency $f_{00}$ in the air, so that an inexpensive and simple device configuration without using a PLL circuit can be realized.

Second Embodiment

Figure 9:
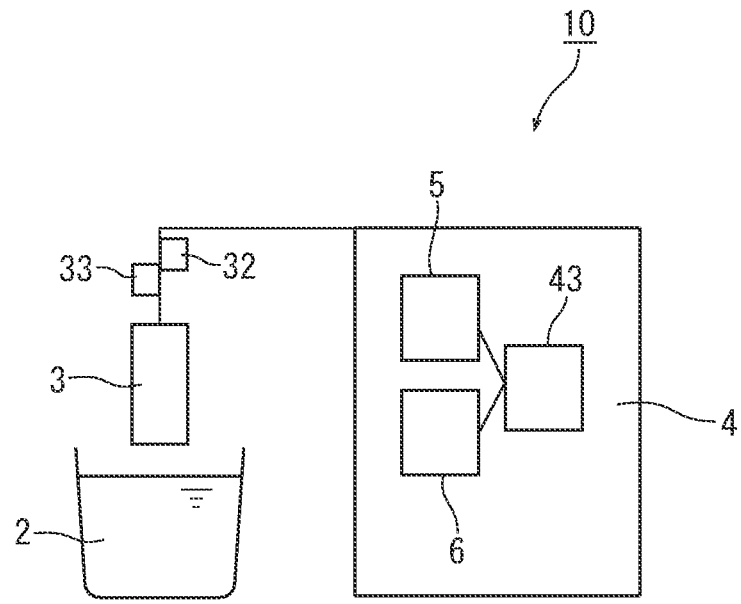
FIG. 9 is a configuration diagram of a viscoelasticity measuring device according to a second embodiment.

The present embodiment is based on the idea of (Method 1) described above. FIG. 9 is an entire schematic view of a viscoelasticity measuring device according to a second embodiment of the present invention. The same configuration as in the first embodiment is provided with the same reference signs and description thereof is omitted. The viscoelasticity measuring device 10 of the present embodiment includes the vibrator 3 and the device main body 4 supporting the vibrator 3. The vibrator 3 is provided with a driving unit 32 that drives the vibrator 3, and a detection sensor 33 that detects a vibration change of the vibrator 3. The reference sign 2 denotes a measurement liquid.

The reference sign 5 denotes a phase difference measuring unit, and the reference sign 6 denotes an amplitude measuring unit. The phase difference measuring unit 5 measures a phase difference between two voltages of a drive signal voltage to be applied to the driving unit 32 and a sensor output signal voltage of the detection sensor 33. The amplitude measuring unit 6 measures an amplitude by analyzing a sensor output signal of the detection sensor 33 by FFT (Fast Fourier Transform), etc. The amplitude measuring unit 6 can be realized by electronic circuits such as a CPU (Central Processing Unit), an ASIC (Application Specific Integrated Circuit), and a PLD (Programmable Logic Device) such as an FPGA (Field Programmable Gate Array), etc. The phase difference measuring unit 5 can perform a measurement by using a generally distributed voltmeter (vector voltmeter) or the technology of FFT (Fast Fourier Transform), etc., as in the amplitude measuring unit 6, however, the technologies to be used are not limited to these. Detection values detected by the phase difference measuring unit 5 and the amplitude measuring unit 6 are acquired in the arithmetic processing unit 43.

Figure 10:
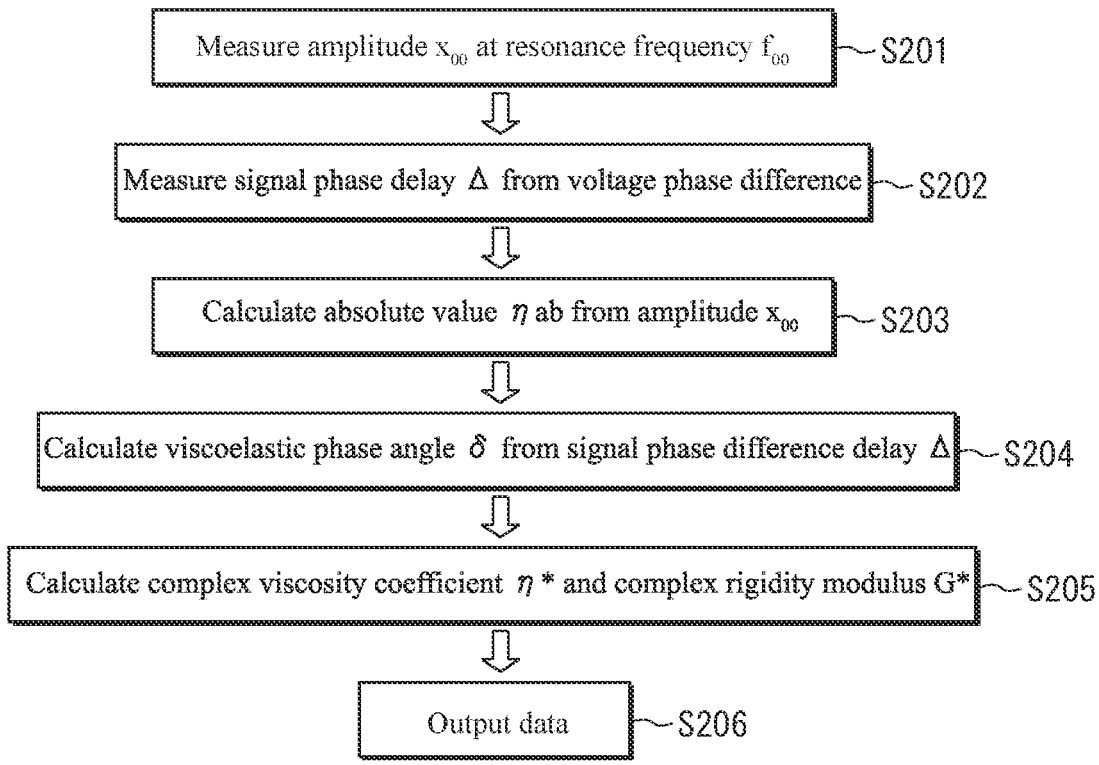
FIG. 10 is a flowchart of a viscoelasticity measuring method according to the second embodiment.

A viscoelasticity measuring method according to the present embodiment is performed as follows. FIG. 10 is a flowchart of the viscoelasticity measuring method according to the second embodiment.

When a measurement is started, the processing shifts to Step S201, and the vibrator 3 is vibrated at a resonance frequency $f_{00}$ in a measurement liquid 2, and an amplitude $x_{00}$ is measured. Next, the processing shifts to Step S202, and a voltage phase difference A (signal phase delay $\Delta$) between a drive signal and a sensor output signal is measured. Next, the processing shifts to Step S203, and the arithmetic processing unit 43 calculates an absolute value $\eta_{ab}$ of a complex viscosity from the amplitude $x_{00}$. Next, the processing shifts to Step S204, and the arithmetic processing unit 43 calculates a viscoelastic phase angle $\delta$ of the measurement liquid 2 from the signal phase delay $\Delta$. Next, the processing shifts to Step S205, and the arithmetic processing unit 43 calculates a complex viscosity coefficient $\eta^*$ and a complex rigidity modulus $G^*$ from the absolute value $\eta_{ab}$ and the viscoelastic phase angle $\delta$. Then, the processing shifts to Step S206, and after the respective calculation data are output, the measurement is ended.

As above, according to the viscoelasticity measuring method according to the present embodiment and the viscoelasticity measuring device 10 for the method, (i) The number of measurement points is only one according to a resonance frequency $f_{00}$ (single frequency).
(ii) An absolute value $\eta_{ab}$ is obtained based on an amplitude $x_{00}$, and a viscoelastic phase angle $\delta$ is obtained based on a voltage phase difference (signal phase delay $\Delta$).
(iii) The measurement is performed only by using a generally distributed vector voltmeter and the technology of FFT, so that an inexpensive and simple device configuration without using a PLL circuit can be realized.

Here, in the first and second embodiments, the detection sensor 33 is a displacement sensor, however, as described above, the detection sensor 33 can be replaced by a speed sensor or an accelerometer. In this case, depending on the type of the sensor, for a relational expression of $\Delta$ and $\delta$, the numerical expression 16, the numerical expression 19, or the numerical expression 22 is referred to, and for a relational expression of $\eta_{ab}$ and I, Q, the numerical expression 41, the numerical expression 66, or the numerical expression 67 is referred to.

Preferred embodiments and modifications of the present invention have been described above, and these can be modified based on the knowledge of a person skilled in the art, and such a modified embodiment is also included in the scope of the present invention.

DESCRIPTION OF SYMBOLS

1 Viscoelasticity measuring device
2 Measurement liquid
3 Vibrator
32 Driving unit
33 Detection sensor
43 Arithmetic processing unit
44 Quadrature detection unit
5 Phase difference measuring unit
6 Amplitude measuring unit

The invention claimed is:
1. A viscoelasticity measuring method, wherein
a vibrator is immersed in a measurement liquid, a drive signal for driving the vibrator at a resonance frequency

($f_{00}$) of the vibrator in the air is output, vibration of the vibrator is detected by a detection sensor, and a signal phase delay ($\Delta$) of a sensor output signal of the detection sensor with respect to the drive signal is measured.

2. The viscoelasticity measuring method according to claim 1, wherein
an amplitude ($x_{00}$) of the vibrator is measured,
an absolute value ($\eta_{ab}$) of a complex viscosity of the measurement liquid is calculated from the amplitude ($x_{00}$), a resonance angular frequency ($\omega_{00}$) corresponding to the resonance frequency ($f_{00}$), and a density ($\rho$) of the measurement liquid based on a numerical expression (1):

$$x_{00} = \frac{F}{\omega_{00}\sqrt{\omega_{00}\rho\eta_{ab}}} \qquad \text{[Numerical Expression 1]}$$

and
a viscoelastic phase angle ($\delta$) of the measurement liquid is calculated from the signal phase delay ($\Delta$).

3. The viscoelasticity measuring method according to claim 2, wherein
in the step of calculating the viscoelastic phase angle ($\delta$), the viscoelastic phase angle ($\delta$) is calculated from a relational expression of,
(i) when the detection sensor is a displacement sensor or an accelerometer, a numerical expression (3):

$$\Delta = \frac{\pi}{4} + \frac{\delta}{2} \qquad \text{[Numerical Expression 3]}$$

(ii) when the detection sensor is a speed sensor, a numerical expression (4):

$$\Delta = -\frac{\pi}{4} + \frac{\delta}{2}. \qquad \text{[Numerical Expression 4]}$$

4. The viscoelasticity measuring method according to claim 2, further comprising: a step of calculating a complex viscosity coefficient ($\eta^*$) and a complex rigidity modulus ($G^*$) of the measurement liquid from the viscoelastic phase angle ($\delta$) and the absolute value ($\eta_{ab}$) of the complex viscosity.

5. The viscoelasticity measuring method according to claim 1, comprising:
a step of outputting the drive signal for driving, in the measurement liquid, the vibrator at the resonance frequency ($f_{00}$) of the vibrator in the air;
a step of detecting the vibration of the vibrator as the sensor output signal from the detection sensor;
a step of generating a complex baseband signal having an in-phase component I in phase with the drive signal and a quadrature component Q orthogonal to the drive signal by quadrature detection of the sensor output signal;
a step of calculating a signal phase delay ($\Delta$) of the sensor output signal with respect to the drive signal from the complex baseband signal values (I, Q) based on a numerical expression (2):

$$\Delta = \tan^{-1}\frac{Q}{I} \qquad \text{[Numerical Expression 2]}$$

and
a step of calculating a viscoelastic phase angle ($\delta$) of the measurement liquid from the signal phase delay ($\Delta$).

6. The viscoelasticity measuring method according to claim 5, further comprising:
a step of calculating an absolute value ($\eta_{ab}$) of the complex viscosity of the measurement liquid from the complex baseband signal values (I, Q), an angular frequency ($\omega_{00}$) of the resonance frequency ($f_{00}$), a driving force (F) for the vibrator, and a density ($\rho$) of the measurement liquid.

7. The viscoelasticity measuring method according to claim 6, wherein
in the step of calculating an absolute value ($\eta_{ab}$) of a complex viscosity of the measurement liquid, an absolute value ($\eta_{ab}$) of the complex viscosity is calculated from a relational expression of,
(i) when the detection sensor is a displacement sensor, a numerical expression (5):

$$\sqrt{I^2 + Q^2} = \frac{F}{2\omega_{00}\sqrt{\omega_{00}\rho\eta_{ab}}} \qquad \text{[Numerical Expression 5]}$$

(ii) when the detection sensor is a speed sensor, a numerical expression (6):

$$\sqrt{I^2 + Q^2} = \frac{F}{2\sqrt{\omega_{00}\rho\eta_{ab}}} \qquad \text{[Numerical Expression 6]}$$

(iii) when the detection sensor is an accelerometer, a numerical expression (7):

$$\sqrt{I^2 + Q^2} = \frac{\omega_{00}F}{2\sqrt{\omega_{00}\rho\eta_{ab}}}. \qquad \text{[Numerical Expression 7]}$$

8. The viscoelasticity measuring method according to claim 6, further comprising: a step of calculating a complex viscosity coefficient ($\eta^*$) and a complex rigidity modulus ($G^*$) of the measurement liquid from the viscoelastic phase angle ($\delta$) and the absolute value ($\eta_{ab}$) of the complex viscosity.

9. The viscoelasticity measuring method according to claim 5, wherein
in the step of calculating the viscoelastic phase angle ($\delta$), the viscoelastic phase angle ($\delta$) is calculated from a relational expression of,
(i) when the detection sensor is a displacement sensor or an accelerometer, a numerical expression (3):

$$\Delta = \frac{\pi}{4} + \frac{\delta}{2} \qquad \text{[Numerical Expression 3]}$$

(ii) when the detection sensor is a speed sensor, a numerical expression (4):

$$\Delta = -\frac{\pi}{4} + \frac{\delta}{2}. \qquad \text{[Numerical Expression 4]}$$

10. A viscoelasticity measuring device comprising:
a vibrator;
a driving unit configured to vibrate the vibrator;
a detection sensor configured to detect vibration of the vibrator;
an amplitude measuring unit configured to measure, in a measurement liquid, an amplitude ($x_{00}$) at a resonance frequency ($f_{00}$) of the vibrator in the air;
a phase difference measuring unit configured to measure a phase difference between a drive signal for the driving unit and a sensor output signal from the detection sensor as a signal phase delay ($\Delta$); and
an arithmetic processing unit configured to calculate an absolute value ($\eta_{ab}$) of a complex viscosity of the measurement liquid from the amplitude ($x_{00}$), and calculate a viscoelastic phase angle ($\delta$) of the measurement liquid from the signal phase delay ($\Delta$).

11. The viscoelasticity measuring device according to claim 10, wherein the arithmetic processing unit calculates a complex viscosity coefficient ($\eta^*$) and a complex rigidity modulus ($G^*$) of the measurement liquid from the viscoelastic phase angle ($\delta$) and the absolute value ($\eta_{ab}$) of the complex viscosity.

12. A viscoelasticity measuring device comprising:
a vibrator;
a driving unit configured to vibrate the vibrator;
a detection sensor configured to detect vibration of the vibrator;
a quadrature detection unit configured to output a drive signal to the driving unit, receive a sensor output signal from the detection sensor, and perform quadrature detection of the sensor output signal to generate a complex baseband signal having an in-phase component I in phase with the drive signal and a quadrature component Q orthogonal to the drive signal; and
an arithmetic processing unit configured to calculate a signal phase delay ($\Delta$) of the sensor output signal with respect to the drive signal from the complex baseband signal values (I, Q), and calculate a viscoelastic phase angle ($\delta$) of the measurement liquid from the signal phase delay ($\Delta$).

13. The viscoelasticity measuring device according to claim 12, wherein the arithmetic processing unit calculates an absolute value ($\eta_{ab}$) of a complex viscosity of the measurement liquid from the complex baseband signal values (I, Q), an angular frequency ($\omega_{00}$) of the resonance frequency ($f_{00}$), a driving force (F) for the vibrator, and a density ($\rho$) of the measurement liquid.

14. The viscoelasticity measuring device according to claim 13, wherein the arithmetic processing unit calculates a complex viscosity coefficient ($\eta^*$) and a complex rigidity modulus ($G^*$) of the measurement liquid from the viscoelastic phase angle ($\delta$) and the absolute value ($\eta_{ab}$) of the complex viscosity.

* * * * *